United States Patent
Hwang et al.

(10) Patent No.: US 7,798,882 B2
(45) Date of Patent: Sep. 21, 2010

(54) METHOD OF MANUFACTURING ELECTRON EMISSION DEVICE AND ELECTRON EMISSION DEVICE MANUFACTURED BY THE METHOD

(75) Inventors: Myung-Ick Hwang, Suwon-si (KR); Sung-Hee Cho, Suwon-si (KR); Jae-Sang Ha, Suwon-si (KR); Jong-Hwan Park, Suwon-si (KR); Deok-Hyeon Choe, Suwon-si (KR); Nae-Sung Lee, Seoul (KR); Jun-Seop Kim, Seoul (KR); Ji-Hyun Jeon, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 358 days.

(21) Appl. No.: 11/891,264

(22) Filed: Aug. 8, 2007

(65) Prior Publication Data

US 2008/0036359 A1    Feb. 14, 2008

Related U.S. Application Data

(60) Provisional application No. 60/836,781, filed on Aug. 9, 2006.

(30) Foreign Application Priority Data

Aug. 7, 2007   (KR) ...................... 10-2007-0079163

(51) Int. Cl.
   *H01J 9/04* (2006.01)
(52) U.S. Cl. ........................................ 445/50; 313/495
(58) Field of Classification Search ................. 313/495; 445/35, 50
   See application file for complete search history.

(56) References Cited

U.S. PATENT DOCUMENTS

| 2005/0032255 A1* | 2/2005 | Kitamura et al. ............... 438/20 |
| 2005/0272342 A1* | 12/2005 | Chen et al. .................... 445/50 |
| 2006/0197429 A1* | 9/2006 | Ryu et al. .................... 313/311 |

FOREIGN PATENT DOCUMENTS

KR   2002-0018590 A   3/2002

OTHER PUBLICATIONS

Korean Patent Abstract for Korean Publication No. 1020020018590 A, published Mar. 8, 2002 in the name of Kitamura Shin et al.

Shaw, J., *Effects of surface oxides on field emission from silicon*, J. Vac. Sci. Technol. B, vol. 18, No. 4, Jul./Aug. 2000, pp. 1817-1824.

(Continued)

*Primary Examiner*—Joseph L Williams
*Assistant Examiner*—Andrew J Coughlin
(74) *Attorney, Agent, or Firm*—Christie, Parker & Hale, LLP

(57) ABSTRACT

Provided is a method of manufacturing an electron emission device. The method includes: forming electron emission sources including a carbon-based material; and emitting electrons from the electron emission sources in a chamber containing a gas. Accordingly, an electron emission display device employing the electron emission device can improve uniformity between pixels and increase device lifespan.

17 Claims, 15 Drawing Sheets
(13 of 15 Drawing Sheet(s) Filed in Color)

OTHER PUBLICATIONS

Liang, X.H., et al., *On achieving better uniform carbon nanotube field emission by electrical treatment and the underlying mechanism*, Applied Physics Letters, vol. 88, 111501, (2006), 3 pages.

Wadhawan, A., et al., *Effects of $O_2$, Ar, and $H_2$ gases on the field-emission properties of single-walled and multiwalled carbon nanotubes*, Applied Physics Letters, vol. 79, No. 12, Sep. 17, 2001, pp. 1867-1869.

Hsu, D. *Integrally gated carbon nanotube -on-post field emitter arrays*, Applied Physics Letters, vol. 80, No. 1, Jan. 7, 2002, pp. 118-120.

Hsu, D. et al., *Regeneration of gated carbon nanotube field emission*, J. Vac. Sci. Technol. B, vol. 23, No. 2, Mar./Apr. 2005, pp. 694-697.

\* cited by examiner

METHOD OF MANUFACTURING ELECTRON EMISSION DEVICE AND ELECTRON EMISSION DEVICE MANUFACTURED BY THE METHOD

CROSS-REFERENCE TO RELATED PATENT APPLICATIONS

This application claims priority to and the benefit of U.S. Patent Application No. 60/836,781, filed on Aug. 9, 2006, in the U.S. Patent and Trademark Office, the entire content of which is incorporated herein by reference. In addition, this application claims priority to and the benefit of Korean Patent Application No. 10-2007-0079163, filed on Aug. 7, 2007, in the Korean Intellectual Property Office, the entire content of which is incorporated herein by reference.

BACKGROUND OF THE INVENTION

1. Field of the Invention

The present invention relates to a method of manufacturing an electron emission device, and more particularly, to a method of manufacturing an electron emission device including electron emission sources formed of a carbon-based material and/or a nanomaterial.

2. Description of the Related Art

A field emission device (FED) is a recently developed electron emission device and includes a cold cathode as an electron emission source. The FED utilizes tip structured carbon nanotubes (CNTs) as its electron emission sources. When the electron emission sources, that is, the CNTs, are prepared; some of the CNTs are embedded (or buried or partially buried) in a surface and other CNTs are formed on the surface. The diameters and/or lengths of many of the CNTs formed on the surface are not uniform. However, the uniformity of the emitters, i.e., the electron emission sources, is an important factor in determining the display uniformity and other display characteristics.

SUMMARY OF THE INVENTION

Aspects of embodiments of the present invention are directed to a method of manufacturing an electron emission device that can improve electron emission efficiency of the electron emission device by making uniform (or more uniform) the diameters and/or lengths of electron emission sources including a carbon-based material and/or a nanomaterial, and/or an electron emission device manufactured by the method.

According to an aspect of the present invention, there is provided a method of manufacturing an electron emission device, the method including: forming electron emission sources including a carbon-based material; and emitting electrons from the electron emission sources in a chamber containing a gas.

The gas may include oxygen. The chamber containing the gas may have a vacuum degree of $8\times10^{-6}$ to $8\times10^{-3}$ torr. The emitting of the electrons from the electron emission sources may be performed for 10 minutes to 5 hours. In the emitting of the electrons from the electron emission sources, a current may be applied to the electron emission sources at a current density of 10 μA/cm$^2$ to 100 mA/cm$^2$. The gas may include $CH_3$ or $H_2$. According to another aspect of the present invention, there is provided an electron emission device manufactured by the method. Herein, $O_2$ treatment refers to an electron emission from the electron emission sources in the chamber containing the oxygen.

BRIEF DESCRIPTION OF THE DRAWINGS

The accompanying drawings, together with the specification, illustrate exemplary embodiments of the present invention, and, together with the description, serve to explain the principles of the present invention.

The patent or application file contains at least one drawing/picture executed in color. Copies of this patent or patent application publication with color drawing/picture(s) will be provided by the Office upon request and payment of the necessary fee.

DETAILED DESCRIPTION

In the following detailed description, only certain exemplary embodiments of the present invention are shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature, and not restrictive.

As described above, since uniformity of the emitters, i.e., the electron emission sources, is an important factor in determining the display uniformity and other display characteristics, there is a need to improve the uniformity of the diameters and/or lengths of the CNTs formed on a surface that may be not uniform. Accordingly, in order to improve the uniformity of the CNTs, attempts have been made to make uniform the lengths and/or diameters of the emitters and shapes of the tips of the emitters. However, there is a limitation in ensuring the uniformity of the emitters unless the uniformity of a CNT powder is ensured first. Accordingly, it is necessary to ensure the uniformity of the CNT powder included in the electron emission sources.

Figure 1:
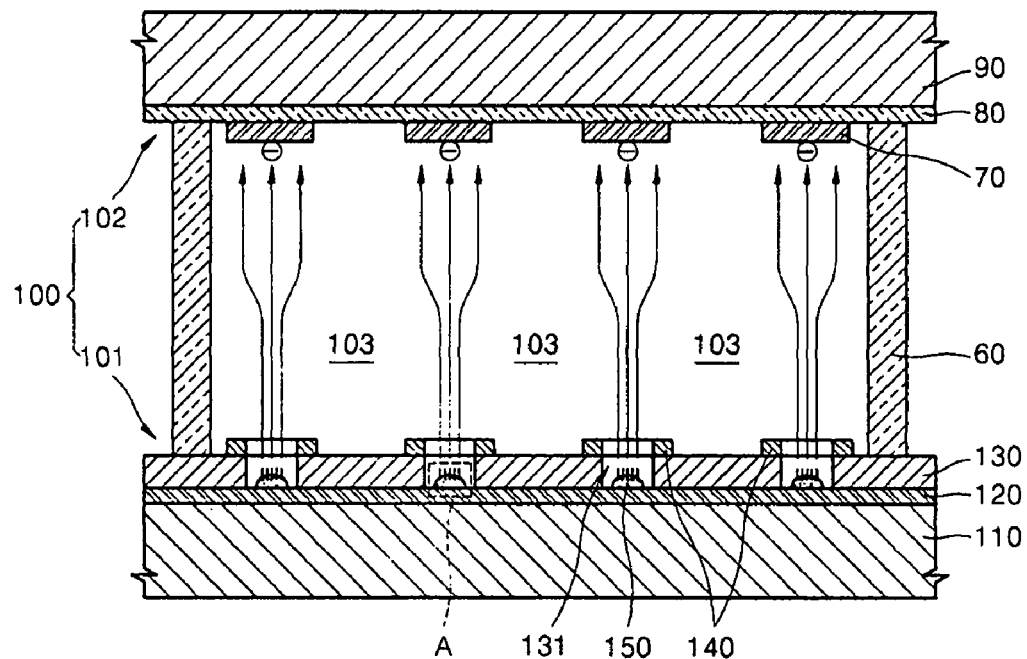
FIG. 1 is a partial cross-sectional view of a conventional electron emission display device.

FIG. 1 is a partial cross-sectional view of a conventional electron emission display device. An electron emission device manufactured by a method of manufacturing an electron emission device according to an embodiment of the present invention can be applied to (or into) the conventional electron emission display device of FIG. 1.

Referring to FIG. 1, an electron emission device 101 includes a first substrate 110, cathodes 120, gate electrodes 140, a first insulating layer 130, and electron emission sources 150.

The insulating layer 130 is interposed between the gate electrodes 140 and the cathodes 120. The first insulating layer 130 insulates the cathodes 120 from the gate electrodes 140, thereby preventing (or reducing the likelihood of) a short circuit between the cathodes 120 and the gate electrodes 140. The electron emission sources 150 are electrically connected to the cathodes 120. The electron emission sources 150 may be formed of a carbon-based material such as carbon nanotubes (CNT) having a low work function and high β function, such as graphite, diamond, and/or diamond-like carbon.

The electron emission device 101 can be used in an electron emission display device 100 that generates visible light to create an image. The electron emission display device 100 includes the electron emission device 101, and a front panel 102 parallel to the first substrate 110 of the electron emission device 101. The front panel 102 includes a second substrate 90, an anode 80 placed on the second substrate 90, and phosphor layers 70 placed on the anode 80.

Electron emission source holes 131 are formed at crossings between the gate electrodes 140 and the cathodes 120, and the electron emission sources 150 are disposed in the electron emission source holes 131 (e.g., at area A). The electron emission device 101 including the first substrate 110 and the front panel 102 including the second substrate 90 are separated by a distance (or predetermined distance) and face each other to form a light emission space 103. Spacers 60 are formed between the electrical emission device 101 and the front panel 102 to maintain the gap therebetween. The travel paths of the electrons emitted from the electron emission sources 150 during operation of the electron emission display device 100 are shown in FIG. 1.

A method of manufacturing an electron emission device, which can be utilized in the electron emission display device 100, according to an embodiment of the present invention will now be explained in more detail. The method of manufacturing the electron emission device includes a pre-process for forming electron emission sources of the electron emission device and a post-process for emitting electrons from the electron emission sources in a gas atmosphere including a certain (or predetermined) gas, e.g., oxygen. Such a post-process for emitting electrons from the electron emission sources in a chamber containing the certain (or predetermined) gas, e.g., oxygen, at a certain (or predetermined) atmospheric pressure can lead to an improvement in the uniformity of the diameters and/or lengths of the electron emission sources, e.g., CNTs.

In general, since CNTs have relatively small diameters and functional strength, they can be used as emitters of the electron emission device. However, since commercial CNTs have different diameters and lengths, and CNTs may become non-uniform while the CNTs are formed and electrons are emitted from the formed CNTs, final light emission uniformity distribution may have a certain (or predetermined) degree of scattering. The non-uniformity results in load concentration on some of the CNTs and defects on the CNTs, thereby reducing the lifespan of the CNTs as the emitters.

To solve (or mitigate) these problems, the method of manufacturing the electron emission device according to an embodiment of the present invention utilizes a post-process to improve the light emission uniformity and the lifespan of the CNT emitters formed on cathodes. In order to compare the effect of a sample according to the method according to an embodiment of the present invention with that of a comparative sample, electrical aging, O₂ treatment by which electrons are emitted from the electron emission sources in an O₂ atmosphere, and additional sintering were experimentally performed as post-processes for improving uniformity of the shape of the CNTs that may be non-uniform.

It is found from the experiment that the light emission uniformity of a dot diode type electron emission display device subjected to the electrical aging, the O₂ treatment, and the additional sintering was about 5 to 15% higher than that of a dot diode type electron emission display device without any post-process. Also, the brightness and/or current half-value periods of the dot diode type electron emission display device subjected to the electrical aging, the O₂ treatment, and the additional sintering were from several to tens of times higher than that of the dot diode type electron emission display device without any post-process.

In more detail, a pre-process for forming the electron emission sources performed before the O₂ treatment according to the method of manufacturing the electron emission device according to an embodiment of the present invention will now be explained. Here, the electron emission sources including a carbon-based material, particularly CNTs, are formed by printing and/or chemical vapor deposition (CVD). The method of manufacturing the electron emission device according to the present invention includes the pre-process for forming the electron emission sources and the post-process after forming the electron emission sources. The pre-process of the present invention is not limited to the above-mentioned printing and/or CVD methods, and can include various other suitable methods of forming the electron emission sources as the pre-processes.

The post-process for emitting electrons from the electron emission sources formed by the pre-process in the method of manufacturing the electron emission device according to an embodiment of the present invention will now be explained in more detail. In particular, $O_2$ treatment for making uniform the diameters and/or lengths of electron emission sources will now be explained as the post-process of the method of manufacturing the electron emission device according to an embodiment of the present invention with reference to FIGS. 2 through 4.

Figure 2:
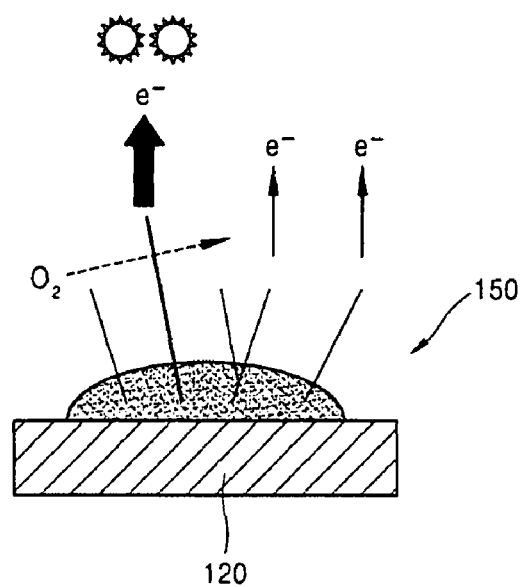
FIG. 2 schematically illustrates an electron emission from electron emission sources through an $O_2$ treatment according to a method of manufacturing an electron emission device according to an embodiment of the present invention.
Figure 3:
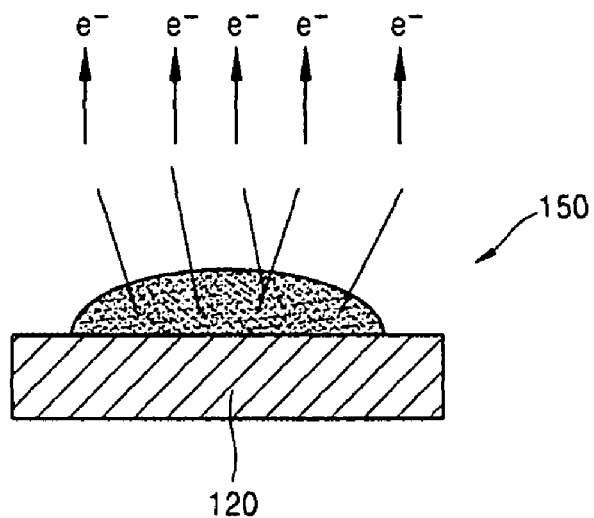
FIG. 3 schematically illustrates the electron emission sources after the $O_2$ treatment according to the method of FIG. 2.

FIG. 2 schematically illustrates an electron emission from electron emission sources 150 formed on cathodes 120 through an $O_2$ treatment according to a method of manufacturing an electron emission device according to an embodiment of the present invention. FIG. 3 schematically illustrates the electron emission sources 150 after the $O_2$ treatment according to the method of FIG. 2.

Referring to FIG. 2, in the $O_2$ treatment, a current is applied at a certain (or predetermined) current density to the electron emission sources 150 when a reactive (or predetermined) gas, such as oxygen, is included in a chamber to repeatedly emit light. Referring to FIG. 3, uniformity in the diameters and/or lengths of the electron emission sources 150 are improved due to the $O_2$ treatment.

Figure 4:
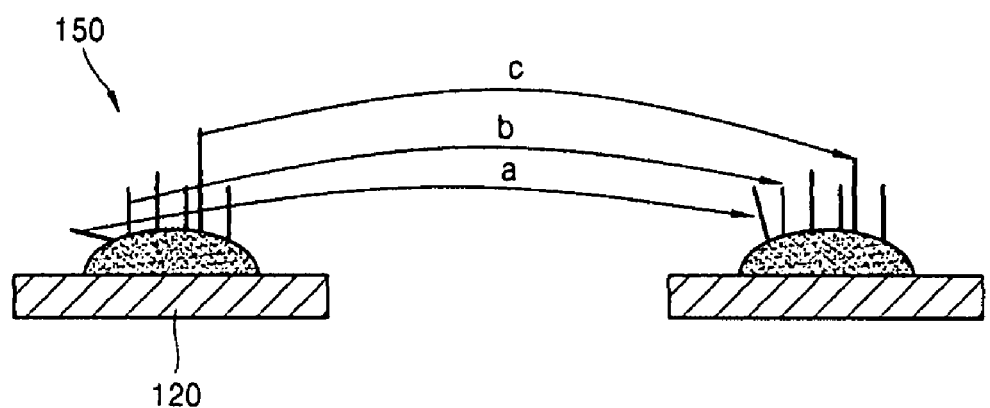
FIG. 4 schematically illustrates the shapes of the electron emission sources before and after the $O_2$ treatment according to the method of FIG. 2.

FIG. 4 illustrates the shapes of the electron emission sources 150 before and after the $O_2$ treatment according to the method of FIG. 2. The directivity of an electron emission source "a" among the electron emission sources 150 is improved. The diameter and/or length of an electron emission source "c" have become similar to those of other electron emission sources. Therefore, all of the electron emission sources 150 have similar diameters and/or lengths to those of an electron emission source "b".

When the electron emission sources are CNTs, an experiment was performed to verify the effect of the CNTs subjected to a post-process in a gas atmosphere (for example, an $O_2$ atmosphere). In the experiment, various post-processes for improving uniformity between pixels and their lifespan, which are desired for the CNTs to act as emitters, were performed and improvements obtained by the post-processes were measured. In order for the CNTs to act as emitters of triode type FEDs, uniformity between pixels, which refers to a brightness difference between pixels, should be higher than 95%, and lifespan should be longer than 50,000 hours based on the brightness half-value period of phosphor layers and/or longer than 50,000 hours based on the current half-value period of the emitters. However, it is still difficult to satisfy these conditions. Particularly, when the emitters are formed by printing, uniformity in the shapes and/or heights of the emitters should be controlled (or completely controlled).

In more detail, the uniformity between pixels is greatly dependent on the distribution of the diameters and lengths of the CNTs. Electron emission from non-uniform CNTs leads to the operation of only some of the CNTs as the emitters, thereby reducing the lifespan of the CNTs. A contact resistance between the emitters and the substrate and a degree of decomposition of xanthan after the sintering of the organic material are also important factors affecting the uniformity between pixels and their lifespan. Accordingly, in order to improve the uniformity of the emitters, a small amount of $O_2$ gas, which helps CNTs to be etched, was injected into a vacuum chamber to quench emission areas of the emitters that excessively emit light (from the emitted electrons of the emitters) and/or to increase areas not contributing to emission when an operating voltage is increased, thereby improving uniformity between pixels.

This $O_2$ treatment was performed on a diode panel sample and a triode panel sample and the effect of the $O_2$ treatment to their lifespan were evaluated. Also, in order to vertically align CNTs and remove initial current reduction of the CNTs, electrical aging at high current density and high electric field was performed. The effect of the electrical aging on uniformity between pixels and their lifespan, when the number of CNTs is increased, was evaluated. Furthermore, additional sintering was performed and the effect of the additional sintering on the uniformity of the diode panel was evaluated and verified. That is, these post-processes increased emission areas, made uniform the emission areas, improved uniformity between pixels, and increased lifespan at rated current. An experiment for verifying the effect of the post-process used in the method of manufacturing the electron emission device of FIG. 2 will now be explained in more detail below.

Experiment

Preparation of Diode and Triode Samples

Figure 5:
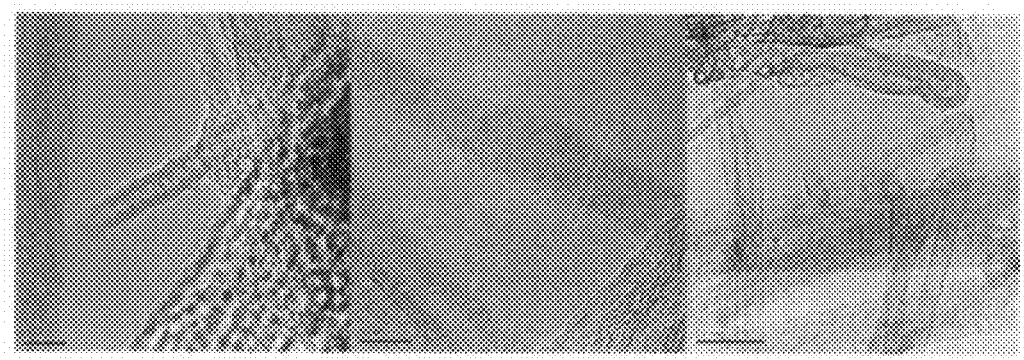
FIG. 5 is a transmission electron microscope (TEM) photograph of a carbon nanotube powder.
Figure 6:
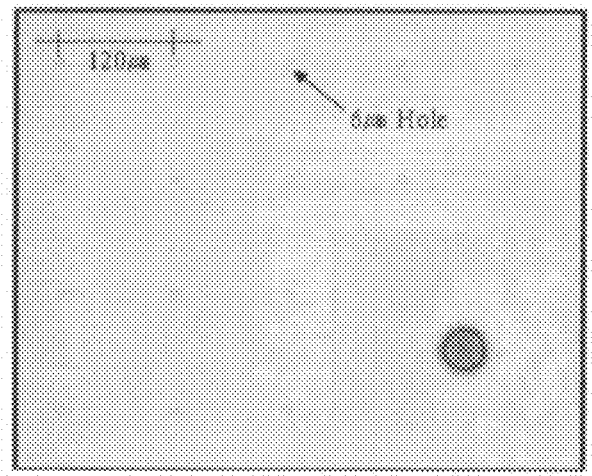
FIG. 6 is an optical photograph of a dot diode cathode sample.
Figure 7:
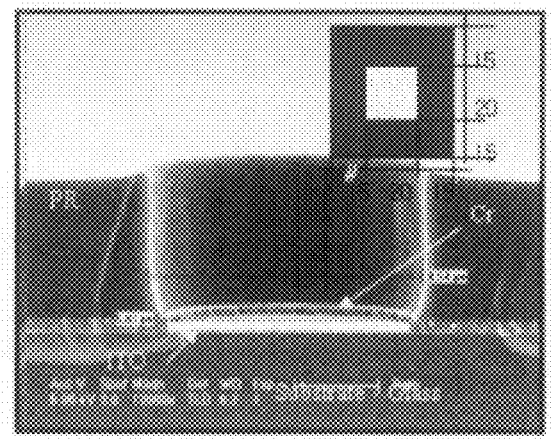
FIG. 7 is a scanning electron microscope (SEM) photograph of the dot diode cathode sample of FIG. 6.
Figure 8:
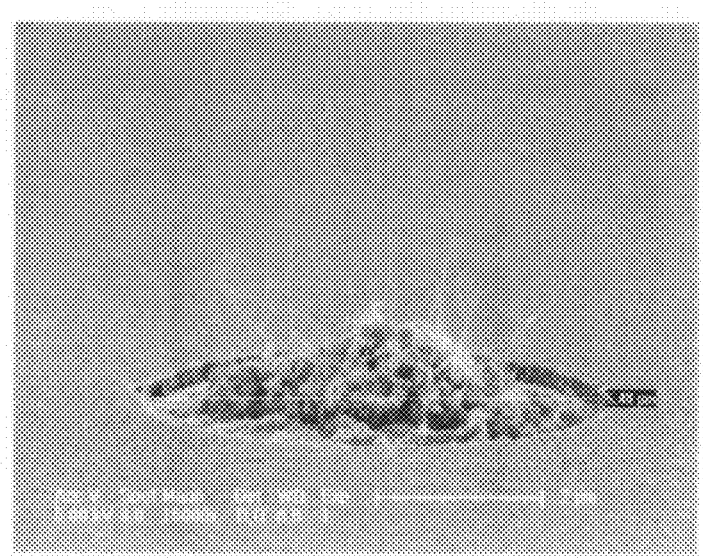
FIG. 8 is an SEM photograph of a carbon nanotube (CNT) dot in the dot diode cathode sample of FIG. 6.
Figure 9:
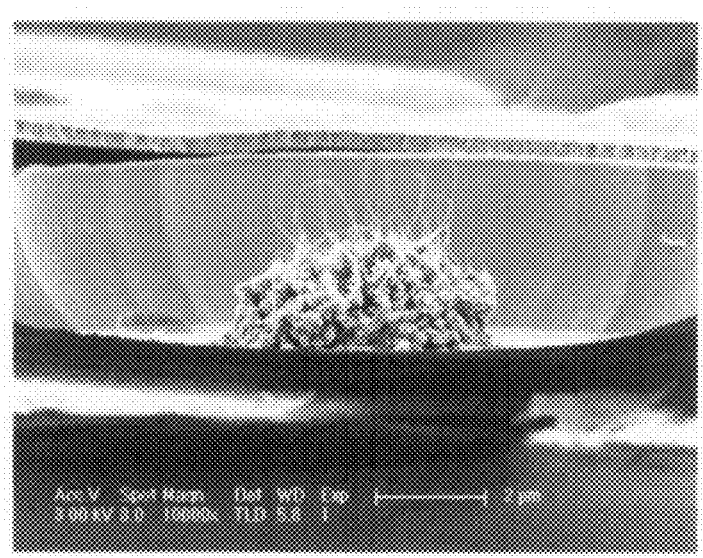
FIG. 9 is an SEM photograph of a CNT dot in a triode sample.

Multi-walled CNTs having diameters ranging from 3 to 5 nm as shown in FIG. 5, which were used as emitters, were mixed with a photosensitive vehicle to prepare a CNT paste. The structure of a 2×2 cm dot diode cathode sample using the prepared paste is shown in FIGS. 6 and 7. A hole had a size of 6 μm, and a CNT dot diode cathode sample was prepared by printing, drying, exposing, and developing the CNT paste in a structure on which a photoresistor for a CNT pattern was coated. The prepared sample was sintered and activated to form a CNT dot, which is shown in FIG. 8. The final dot had a size ranging from 4.5 to 5 μm, and had irregular morphology in which the CNTs were vertically aligned. A triode sample was prepared under the same (or substantially the same) conditions as those of the diode sample. A dot pattern was formed in the same (or substantially the same) process at a double gate structure, and a CNT dot formed in the triode is shown in FIG. 9.

Evaluation and Analysis of Uniformity

The dot diode and pixel triode samples were driven in a chamber at a pressure ranging from $10^{-5}$ to $10^{-6}$ torr using only a green phosphor layer. For the dot diode sample, spacers of 200 μm were used, and a direct current (DC) pulse power supply was supplied at 100 Hz for a period of 10 μs. For the pixel triode sample, an anode voltage ranging from 3 to 5 kV was utilized, and a scan voltage was supplied at 60 Hz for a period of 17 s. The diode sample was fixed to a current density of 1 mA/cm² based on emission areas, and the triode sample was fixed to Ia (anode current)=32 μA when a diagonal length was 2 inches and to Ia=200 μA when a diagonal length was 5 inches.

Figure 10A:
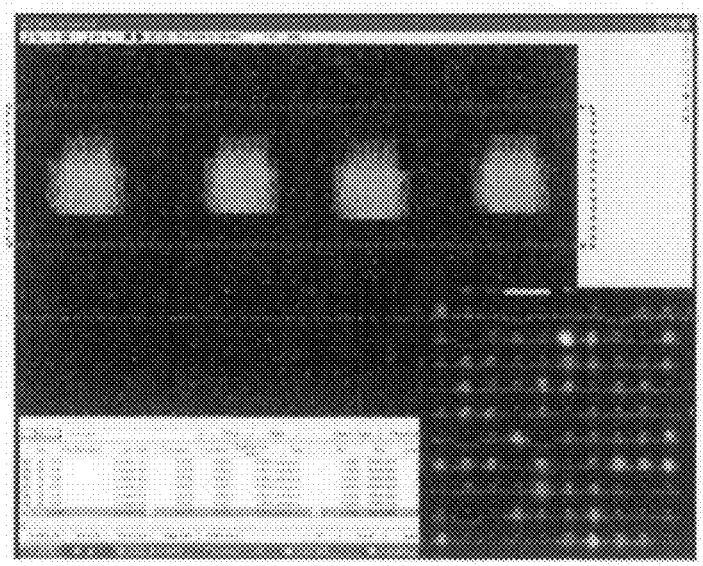
FIGS. 10A and 10B are photographs of an interface of a software program for measuring the uniformity of an electron emission device manufactured by the method of FIG. 2.
Figure 10B:
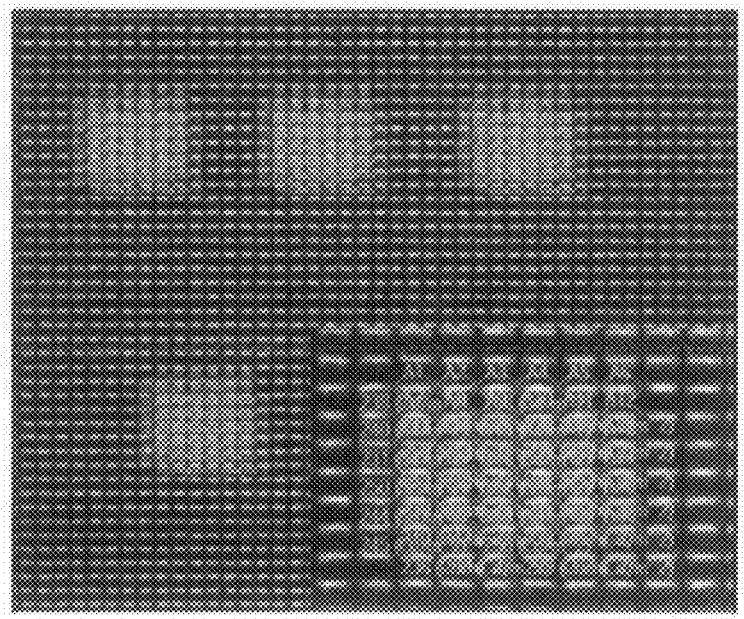

A prometric measurement system of Radiant was used to measure images and brightness as shown in FIGS. 10A and 10B. A light emission image was separated into four groups, 100 circular dots were assigned to each of the four groups, and a-DU(%), which is a measure of dot brightness uniformity, was calculated using the brightness data of the assigned 100 dots (10×10). Here, a-DU (dot uniformity, %) and a-PU (pixel uniformity, %) were respectively calculated by {1-(brightness standard deviation/brightness average)} of dot brightness and pixel brightness×100, and p-DU(%) and p-PU(%) were respectively calculated by maximum/minimum values of dot brightness and pixel brightness×100. The finally used data were averages of the calculations.

Evaluation and Analysis of Lifespan

In order to measure the lifespan of pure CNTs, an anode without a phosphor layer was used, and a panel having a degree of vacuum of $10^{-5}$ torr or more by being packaged with a sealing frit was prepared. The lifespan of the dot diode sample or the pixel triode sample was measured under the same conditions as those used in the measuring of the uniformity. However, a lifespan longer than 1,000 hours was estimated by converting a current axis over time into a log scale and linear fitting.

Experimental Results

Change in Uniformity Due to Post-Process

Change in Uniformity Due to Electrical Aging

Figure 11:
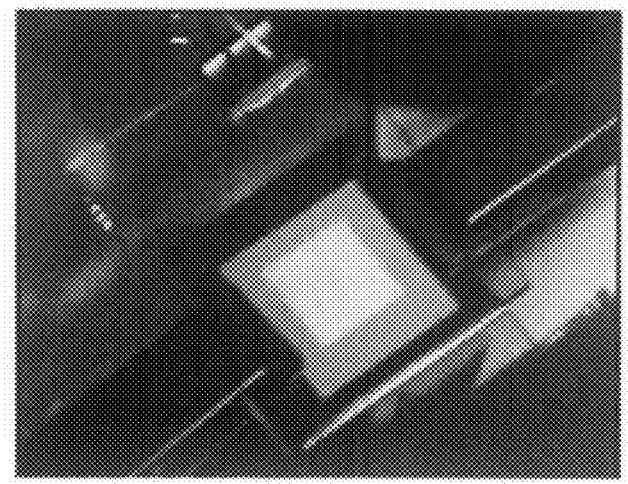
FIG. 11 is a photograph of a dot diode sample.
Figure 12:
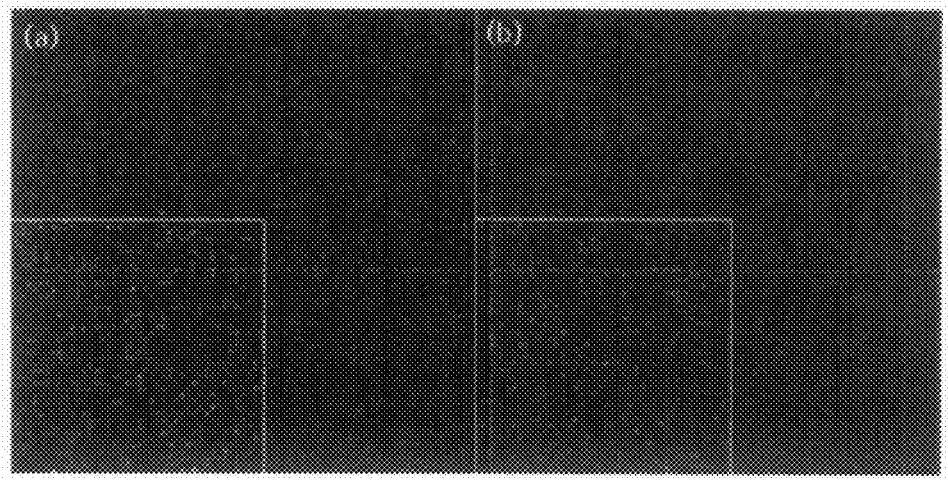
FIG. 12 shows comparative photographs showing pixels before and after the dot diode sample is subjected to electrical aging according to the method of FIG. 2.
Figure 13:
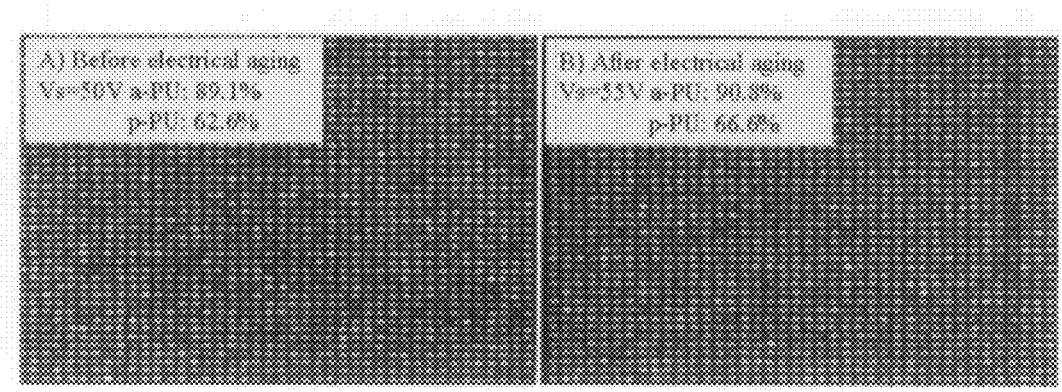
FIG. 13 shows comparative photographs showing pixels before and after a triode sample is subjected to electrical aging.

In order to compare results before and after electrical aging, the 2×2 dot diode sample was fixed to the current density of 1 mA/cm² to emit light in a chamber, and the dot diode sample is shown in FIG. 11. Uniformity before and after the 2×2 dot diode sample was subjected to electrical aging for 10 minutes at 10V/μm was measured and is shown in FIG. 12. After the electrical aging, an operating voltage was increased by approximately 0.3 V/μm and uniformity between pixels was increased by approximately 6%. The improvement may be due to the fact that degree of scattering in the lengths of the CNTs activated by the electrical aging was reduced, which accordingly increased the emission area density. After electrical aging, the triode sample also showed the same result, and the experimental result is shown in FIG. 13. The triode sample was subjected to electrical aging for 1 hour at a current twice as high as a rated current by controlling a scan voltage Vs. After the electrical aging, a-PU was increased by approximately 1.5%.

Change in Uniformity Due to Sintering

Figure 14:
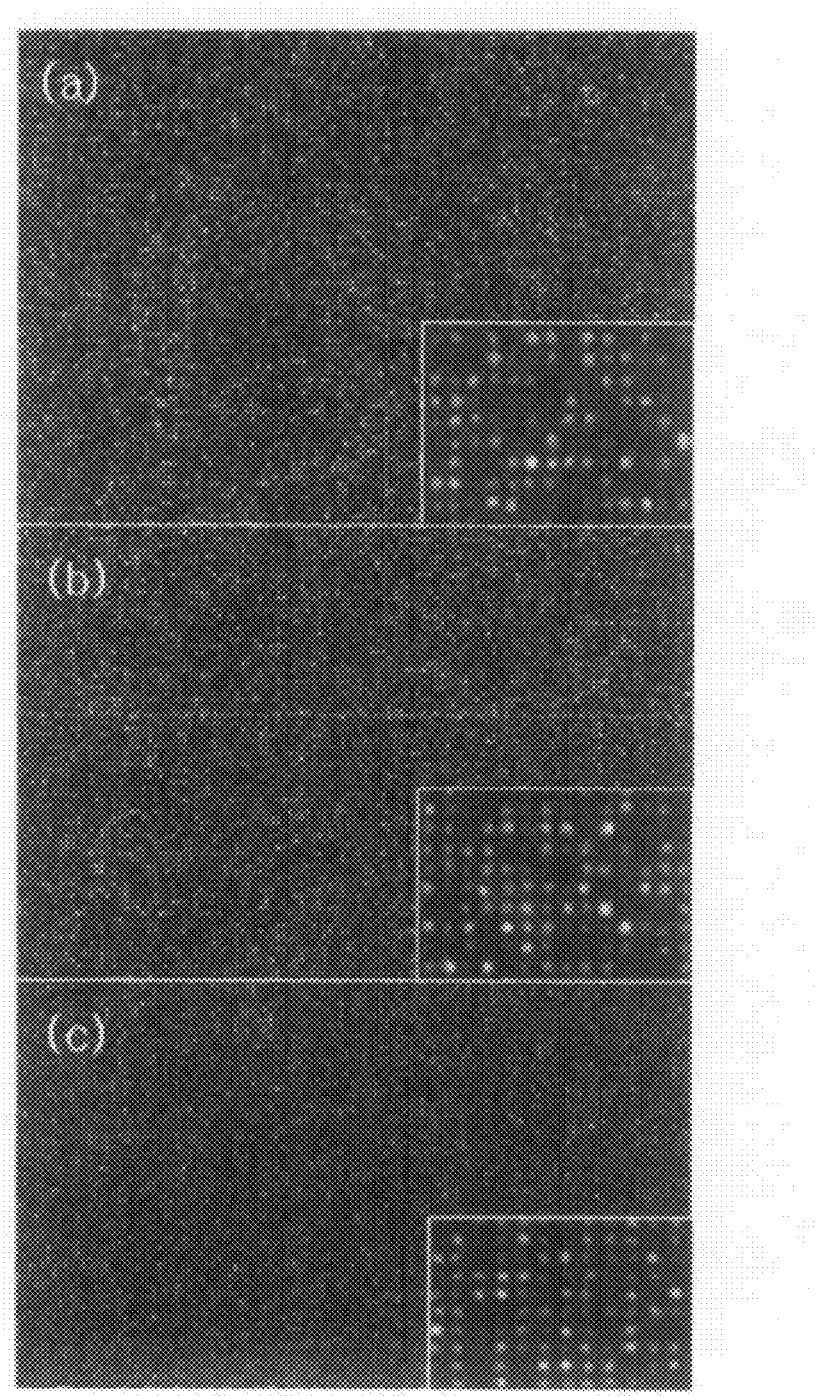
FIG. 14 shows comparative photographs showing pixels before and after a dot diode sample is subjected to sintering according to the method of FIG. 2.

A sample was subjected to additional sintering in air conditions and a change in uniformity between pixels due to the additional sintering is shown in Table 1 and FIG. 14. Uniformity was highest at a sintering temperature of 250° C., and was similar at a sintering temperature of 200° C. between the sample subjected to the sintering and a sample not subjected to the sintering. As the sintering temperature increased above 250° C., uniformity decreased. At a sintering temperature of 370° C., the uniformity of the sample subjected to the sintering was lower than that of the sample not subjected to the sintering. The improvement may be because during the additional sintering, organic xanthan at ends of the CNTs were removed, some of tips of the CNTs having relatively small diameters and great lengths were removed in the air conditions, emission areas became uniform, and thus light emission uniformity increased. Also, the decrease in improvement as the sintering temperature is increased to above 250° C. may be because when the sintering was performed at 370° C. or higher, the tips of the CNTs were excessively reduced, the absolute emission areas were decreased, and thus uniformity decreased.

TABLE 1

Relationship between Uniformity and Additional Sintering in Air Conditions

| | | Temperature (° C.) | | |
|---|---|---|---|---|
| | | 200 | 250 | 370 |
| a-DU (%) | Before aging | 45 | 57 | 34 |
| | After aging | 51 | 61 | 48 |

Change in Uniformity Due to $O_2$ Treatment

Figure 15:
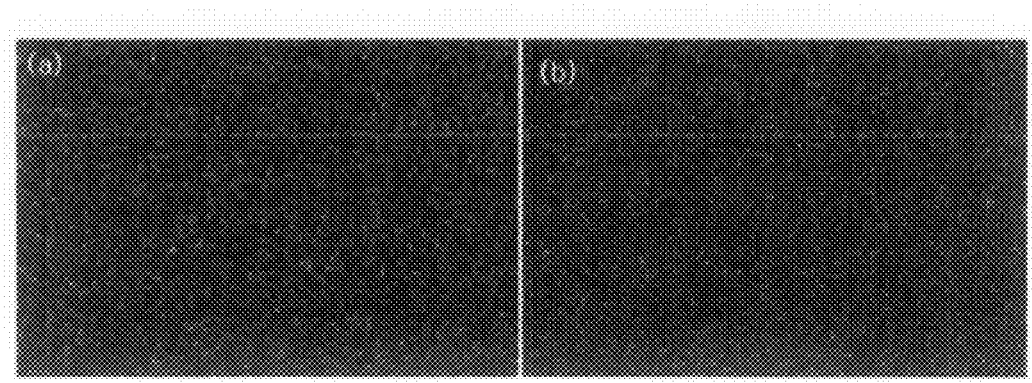
FIG. 15 shows comparative photographs showing pixels before and after a dot diode sample is subjected to $O_2$ treatment according to the method of FIG. 2.

A 2×2 dot diode sample was subjected to $O_2$ treatment by injecting $O_2$ gas into a chamber with a degree of vacuum of $8\times10^{-4}$ torr and repeatedly emitting light twice for 20 minutes at 2 mA/cm², and a change in uniformity due to the $O_2$ treatment is shown in Table 2 and FIG. 15. In FIG. 15, an image "a" is the image of a dot before the $O_2$ treatment and an image b is the image of a dot after the $O_2$ treatment.

TABLE 2

Change in Uniformity Due to $O_2$ Treatment

| | Before $O_2$ treatment | After $O_2$ treatment | No $O_2$ treatment |
|---|---|---|---|
| Electric field (V/μm) | 6.15 | 6.70 | 6.70 |
| Current (mA/cm²) | 1 | 1 | 2.5 |
| a-DU (%) | 48.6 | 57.1 | 47.5 |

Current was drastically reduced after the $O_2$ gas was injected into the chamber, and uniformity at the same current was improved from 48% before the $O_2$ treatment to 57% after the $O_2$ treatment. Also, uniformity after the $O_2$ treatment was higher than uniformity without the $O_2$ treatment at the same voltage of 6.7 V/μm. This improvement may be due to the fact that not only the voltage and current increased, but also uniformity in the shapes of the tips of the CNTs was improved and the voltage accordingly increased, thereby improving uniformity between pixels. A triode sample was subjected to $O_2$ treatment under the same conditions as those of the diode sample and the result of the triode sample is shown in FIG. 16.

Figure 16:
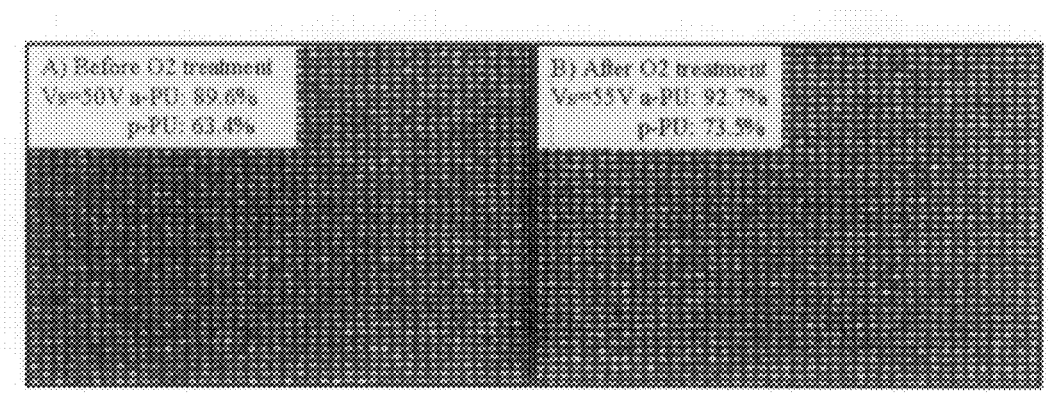
FIG. 16 shows comparative photographs showing pixels before and after a triode sample is subjected to $O_2$ treatment according to the method of FIG. 2.

Referring to FIG. 16, a-PU of the triode sample after the $O_2$ treatment was improved by approximately 3%. Accordingly, it is found that the $O_2$ treatment was superior to the electrical aging in the alignment and the length uniformity of the CNTs. This may be because after injecting $O_2$ gas, loads on some of the tips of the CNTs having small diameters and great lengths were higher, the tips were more effectively etched, and uniformity in the shapes of the CNTs was more rapidly improved than without any injection of $O_2$ gas in a higher vacuum state.

Change in Lifespan Due to Post-Process

Change in Lifespan Due to Electrical Aging

Figure 17:
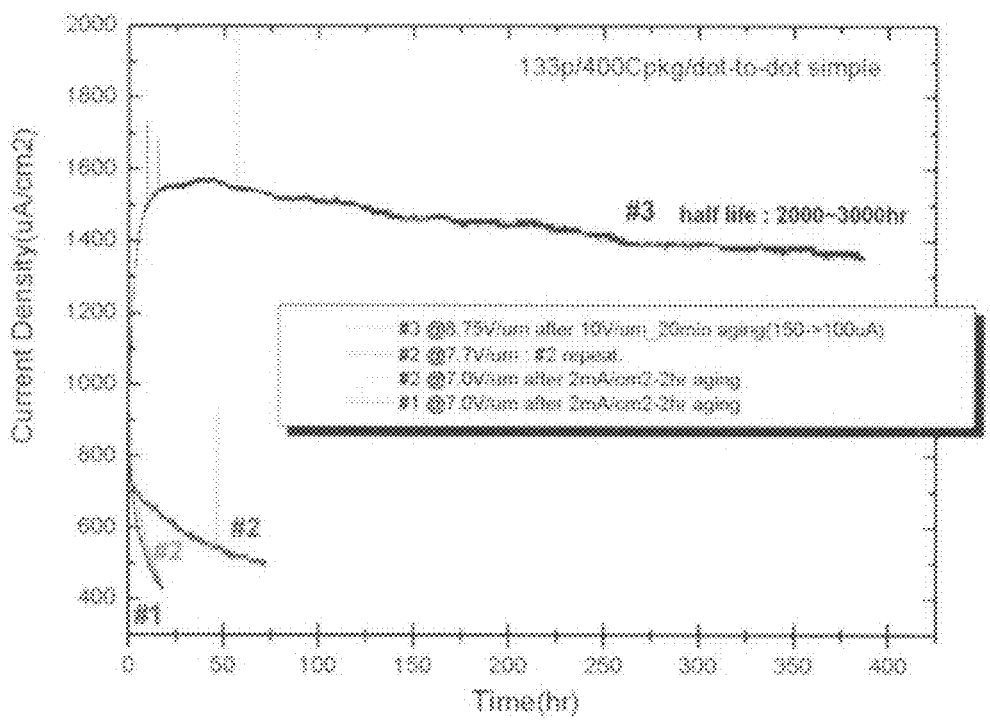
FIG. 17 is a graph illustrating current density versus time for explaining the effect of electrical aging on a package of dot diode samples.

In order to determine the effect of electrical aging of a package of dot diode samples on lifespan, a change in driving current over time was measured and the measurement result is shown in FIG. 17. In the case of a reference sample subjected to aging for 2 hours at 2 mA/cm², which is twice as high as rated current of 1 mA/cm², a current half-value period taken to reduce from 1 mA/cm² to 0.5 mA/cm² was approximately 20 hours. When the sample was repeatedly measured, the lifespan increased to approximately 75 hours. However, in the case of a sample subjected to electrical aging for 20 minutes at a voltage of 10 V/μm, 3 V/μm higher than that of rated aging conditions, a lifespan of 2,000 to 3,000 hours, which was 100 times higher than the lifespan of the reference sample, was expected. This may be because uniformity in the shapes of the tips of the CNTs was improved due to the electrical aging at the relatively higher voltage, loads on the respective tips of the CNTs were reduced, and the tips of the CNTs were effectively aligned at the high voltage, and the emission areas were increased.

Change in Lifespan Due to $O_2$ Treatment

Figure 18:
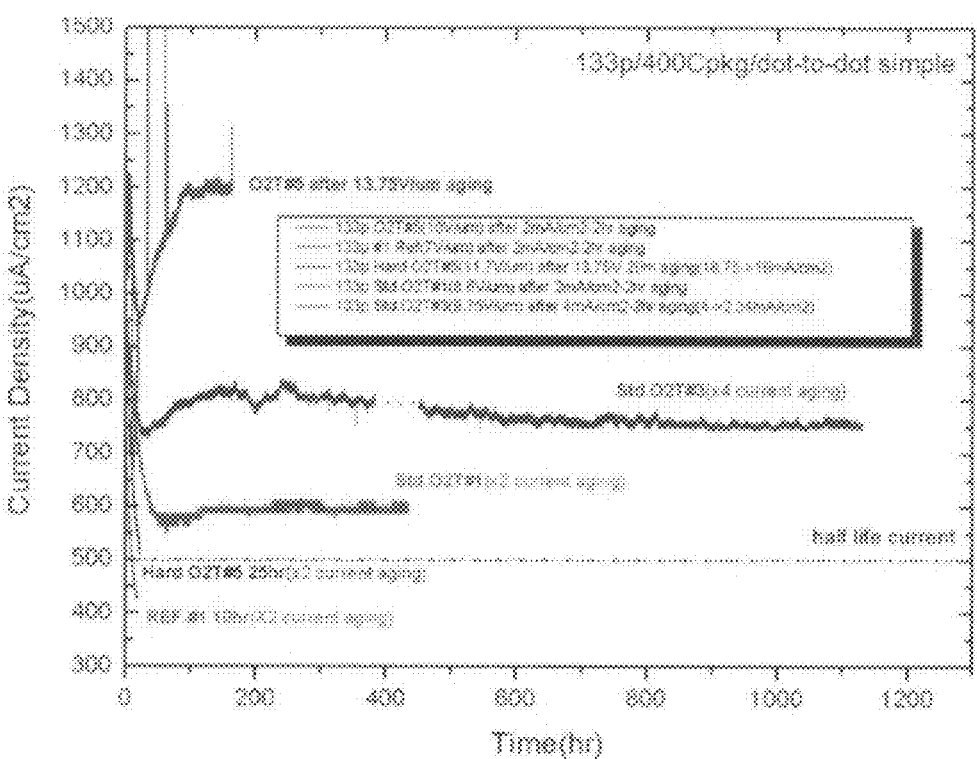
FIG. 18 is a graph illustrating current density versus time after the package of dot diode samples is subjected to electrical aging according to the method of FIG. 2.

The lifespan of the package of samples after $O_2$ treatment was measured and is shown in FIG. 18, and the effect of electrical aging was also measured. When a sample subjected to the $O_2$ treatment and having an operating voltage about 2 V/μm higher than that of a sample not subjected to the $O_2$ treatment was examined under the same electron conditions (twice higher than the rated current) for 2 hours, a current stabilization section was observed in tens of hours and a reduction in the lifespan was drastically diminished.

However, in the case of a sample subjected to excessive $O_2$ treatment and having a high operating voltage of 5 V/μm or so, the sample reached a current half-value period in tens of hours. It seems because the CNTs were damaged due to the excessive $O_2$ treatment, the emission areas decreased. Under the same $O_2$ treatment conditions, when electrical aging was performed at high current or voltage, initial driving deterioration was reduced and a time taken to reach a stabilization section was shortened. In the case of a sample subjected to electrical aging for 2 hours at 4 mA/cm$^2$, the sample stably operated for 1,000 hours or more, current density was not reduced even after a period ranging from 800 to 100 hours, and a lifespan of tens of thousands of hours was expected. This may be because a degree of scattering in both the diameters and the lengths of the CNTs existing between the raw material of the CNTs and the dot produced during the process were improved due to the $O_2$ treatment and the electrical aging, and current loads were distributed on the strong and uniform CNTs.

As described above, in the method of manufacturing the electron emission device of FIG. 2, in the $O_2$ treatment of emitting electrons from the electron emission sources in the chamber containing a certain (or predetermined) gas, the gas contained in the chamber may be oxygen. However, the gas is not limited to oxygen, and may be reactive gas reactable and/or etchable to the emitters, such as $CH_3$ or $H_2$.

When the gas contained in the chamber is oxygen, the degree of vacuum of the chamber may be from 8×10$^{-6}$ torr to 8×10$^{-3}$ torr. This is because when the degree of vacuum is less than 8×10$^{-6}$ torr, aging does not occur and etching is not performed. Also, considering that as oxygen concentration increases, etching occurs faster, when the degree of vacuum of the chamber is greater than 8×10$^{-3}$ torr, the degree of vacuum is reduced and arcing is caused. The post-process for emitting the electron emission sources in the chamber containing the oxygen gas in the method of manufacturing the electron emission device of FIG. 2 may be performed for approximately a period ranging from 10 minutes to 5 hours. When the post-process is performed for less than 10 minutes, etching is insufficient, and when the post-process is performed for longer than 5 hours, an operating voltage may be increased.

Also, in the post-process for emitting the electron emission sources in the chamber containing the oxygen gas according to the method of manufacturing the electron emission device of FIG. 2, the current density of current applied to the electron emission sources may range from 10 μA/cm$^2$ to 100 mA/cm$^2$. When the current density of the current applied to the electron emission sources is less than 10 μA/cm$^2$, etching is insufficient, and when the current density is greater than 100 mA/cm$^2$, excessive etching is carried out, thereby making precise control difficult.

As described above, the diameters and the lengths of the CNTs, which were the electron emission sources, were made uniform by emitting electrons from the CNTs in the chamber in which $O_2$ was injected at a low degree of vacuum of approximately 10$^{-3}$ torr and concentrating loads on CNTs having relatively small diameters and/or great lengths to trim the CNTs. Accordingly, uniformity between pixels was improved by 15% or more in a-DU(dot uniformity) and by several percentages (%) or more in a-PU(pixel uniformity), hot spots were reduced, and the lifespan of the 5-inch triode sample (ITO anode) was increased from hundreds of hours to a period ranging from 1,000 to 2,000 hours. Also, stable operation was achieved after aging for 2 hours at a current two times higher than rated current without repeatedly aging when the electron emission device was initially driven.

To verify the results, an experiment was performed on a 2-inch dot diode type electron emission device. The conditions for four samples were as follows.

First sample: electrical aging was performed for 20 minutes for three times, (total of 60 minutes) at 16 μA (two times higher than rated current), and a degree of vacuum during the electrical aging was 5×10$^{-6}$ torr.

Second sample: $O_2$ treatment of emitting electrons in a chamber containing $O_2$ was performed for 10 minutes for six times (total of 60 minutes) at 80 μA (10 times higher than rated current), and the partial pressure of $O_2$ in the chamber was 1×10$^{-3}$ torr.

Third sample: $O_2$ treatment was performed for 10 minutes for six times (total of 60 minutes) at 120 μA (15 times higher than rated current), and the partial pressure of $O_2$ in the chamber was 8×10$^{-3}$ torr.

Fourth sample: $O_2$ treatment was performed for 20 minutes for three times (total of 60 minutes) at 16 μA (two times higher than rated current), and the partial pressure of $O_2$ in the chamber was 2×10$^{-4}$ torr.

The first sample and the fourth sample were configured with the same current density but different partial pressures of $O_2$. The second sample and the third sample were subjected to $O_2$ treatment under excessive conditions.

Figure 19:
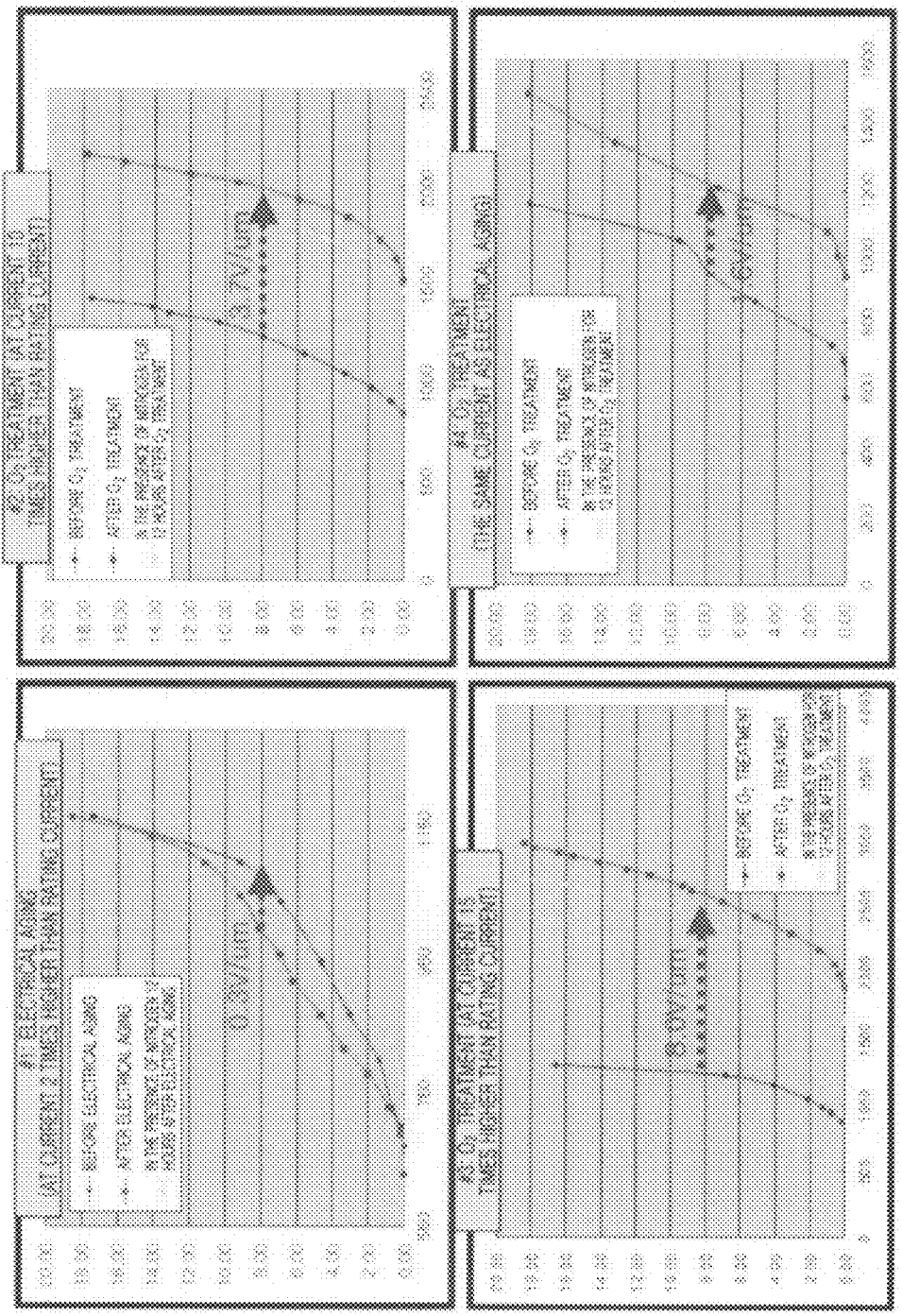
FIG. 19 shows graphs illustrating current versus voltage before and after 2-inch dot diode samples are subjected to electrical aging, before and after they are subjected to $O_2$ treatment, and after they are left in the presence of nitrogen according to the method of FIG. 2.

FIG. 19 shows graphs illustrating current versus voltage before and after the first through fourth samples were subjected to electrical aging, before and after they were subjected to $O_2$ treatment, and after they were left in the presence of nitrogen according to the method of FIG. 2. In FIG. 19, the X-axis represents voltage (V) and the Y-axis represents current (μA). Referring to FIG. 19, the operating voltage of the first sample subjected to only the electrical aging was 5.7V/μm, which was almost the same as that before the electrical aging, and there was almost no change in the voltage after the first sample was left in the presence of the nitrogen. The operating voltage of the fourth sample subjected to the $O_2$ treatment at 16 μA, which was the same current as that of the first sample, was 7.1 V/μm, which was increased by 1.6 V/μm from 5.5 V/μm before the $O_2$ treatment, and there was small recovery in the voltage after the fourth sample was left in the presence of the nitrogen. The operating voltage of the second sample subjected to the excessive $O_2$ treatment was 10.85 V/μm, which was increased by 3.7 V/μm from 7.15 V/μm before the excessive $O_2$ treatment, and there was almost the same recovery after the second sample was left in the presence of the nitrogen. The operating voltage of the third sample was 14.53 V/μm, which was increased by 8.0 V/μm from 6.5 V/μm before the excessive $O_2$ treatment, and there was almost the same recovery after the third sample was left in the presence of the nitrogen. The reason that the sample was left in the presence of the nitrogen was to exclude the effect of gas absorption.

Figure 20:
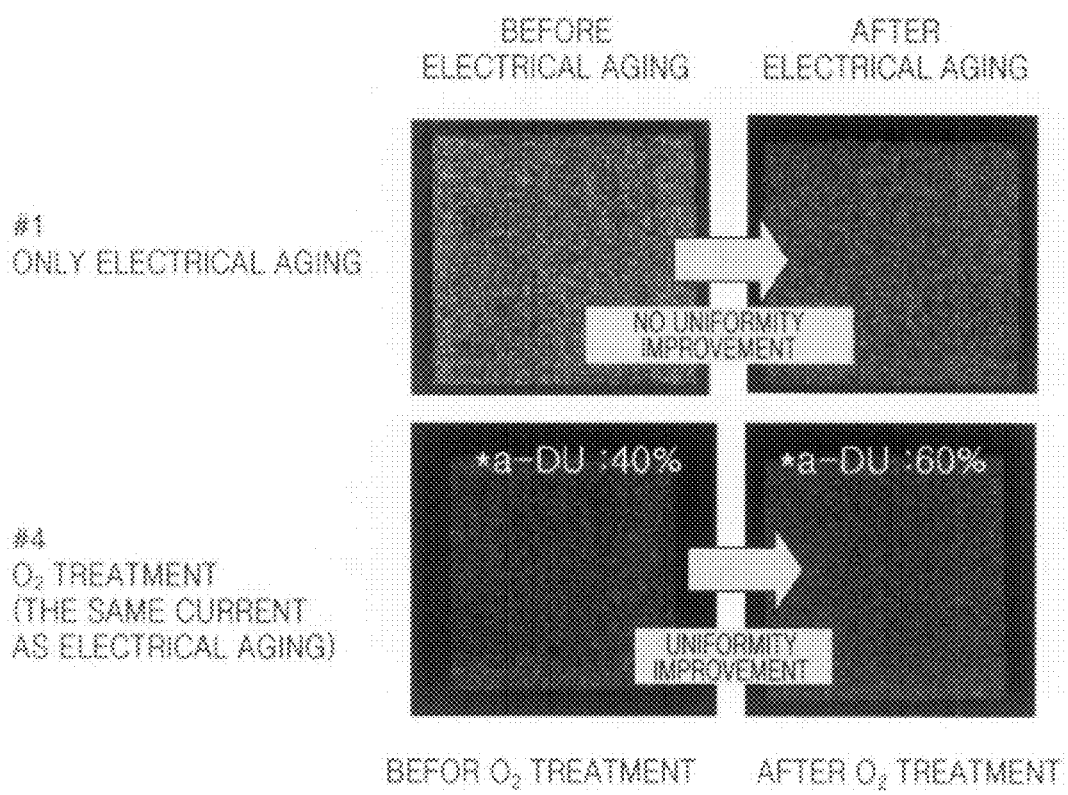
FIG. 20 shows comparative photographs showing the uniformity of pixels before and after the 2-inch dot diode samples are subjected to the electrical aging and before and after they are subjected to the O₂ treatment according to the method of FIG. 2.

FIG. 20 shows comparative photographs showing the uniformity of pixels before and after the first sample and the fourth sample were respectively subjected to the electrical aging and the $O_2$ treatment according to the method of FIG. 2. The first sample and the second sample were measured at the same current of 16 μA. Referring to FIG. 20, in the case of the first sample, there was almost no change in the uniformity before and after the electrical aging. In the case of the fourth sample, a-DU before the $O_2$ treatment was 40% and was 60% after the $O_2$ treatment, thereby improving uniformity between pixels. In the case of the second sample and the third sample, there was similar improvement in uniformity to that of the fourth sample, and uniformity after the $O_2$ treatment was higher than that of the fourth sample.

Figure 21:
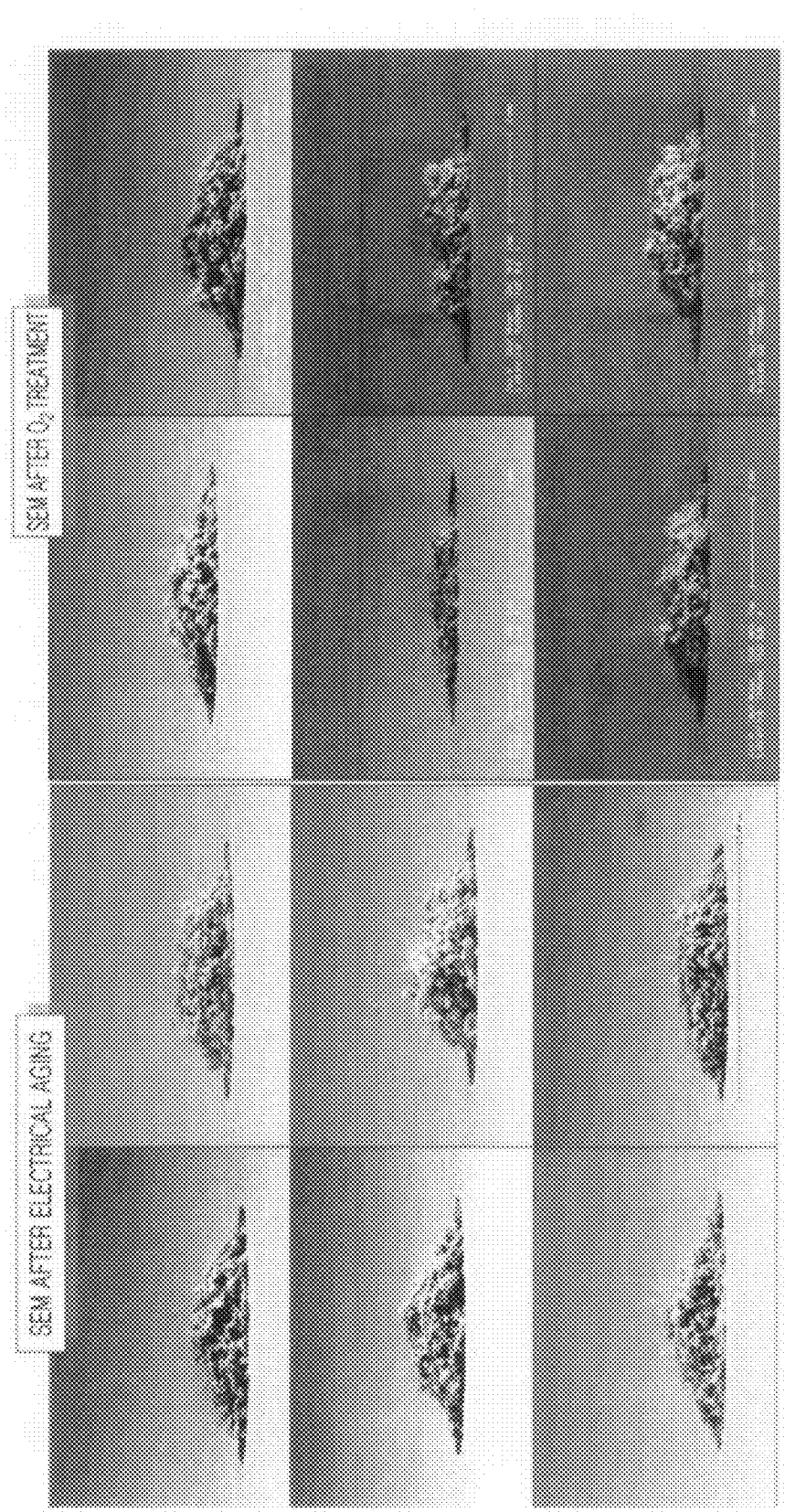
FIG. 21 shows comparative SEM photographs of CNT dots after the electrical aging and CNT dots after the O₂ treatment according to the method of FIG. 2.

FIG. 21 shows comparative SEM photographs of CNT dots after the electrical aging and CNT dots after the $O_2$ treatment according to the method of FIG. 3. Referring to FIG. 21, the lengths of the CNTs after the $O_2$ treatment were shorter and more uniform than those of the CNTs after the electrical aging.

Uniformity was measured by separating a light emission image into four groups, assigning 100 circular dots to each of the four groups, and calculating a-DU/p-DU using the brightness data of the 100 dots (10×10). An evaluation criterion was data of 1 mA/cm². As described above, a-DU (%) was defined by {1-(brightness standard deviation/brightness average)}× 100, and p-DU (%) was defined by minimum/maximum values of brightness×100. The finally used data were the averages of the calculations of the four groups.

Figure 22:
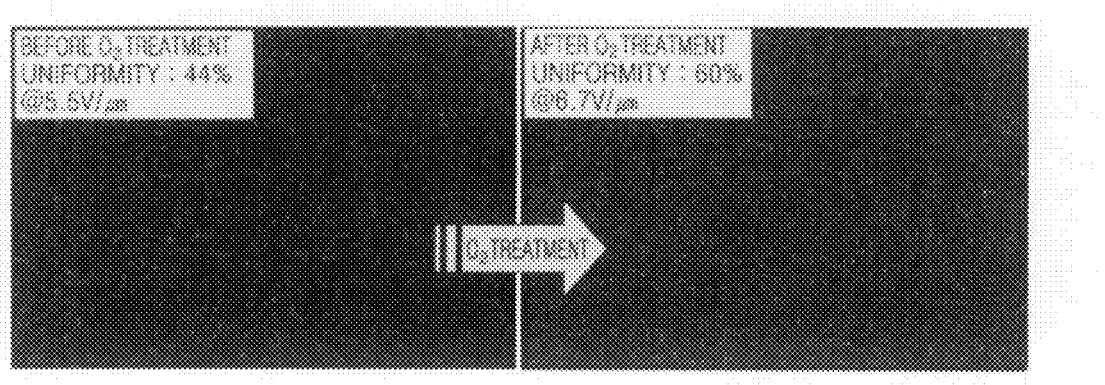
FIG. 22 shows comparative photographs showing the uniformity of pixels before and after a diode type electron emission device is subjected to O₂ treatment according to the method of FIG. 2.
Figure 23:
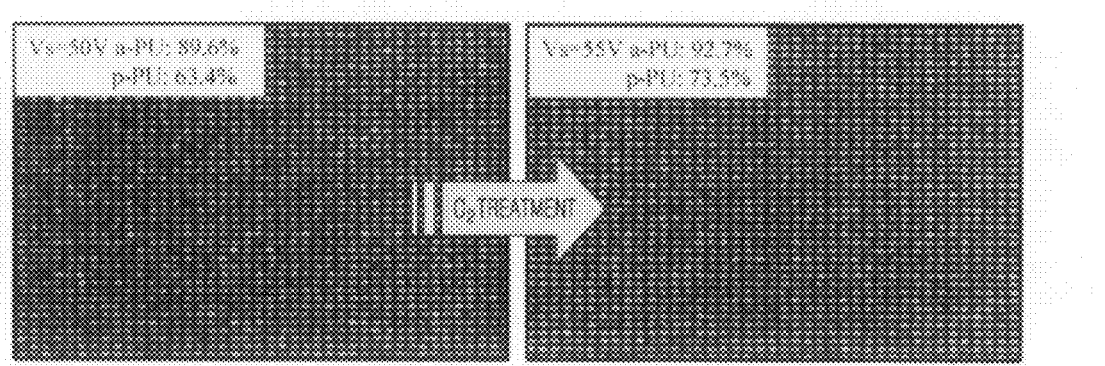
FIG. 23 shows comparative photographs showing the uniformity of pixels before and after a triode type electron emission device is subjected to O₂ treatment according to the method of FIG. 2.

The uniformity of a diode type electron emission display device and a triode type electron emission display device subjected to $O_2$ treatment was measured by the measurement method and the measurement result is shown in FIGS. 22 and 23. FIG. 22 shows comparative photographs showing the uniformity of pixels before and after the diode type electron emission device was subjected to $O_2$ treatment. FIG. 23 illustrates comparative photographs showing the uniformity of pixels before and after the triode type electron emission device was subjected to $O_2$ treatment. Referring to FIG. 22, uniformity a-DU was 44% before the $O_2$ treatment and uniformity a-DU was 60% after the $O_2$ treatment, which was increased about 15% (or 16%) from 44% before the $O_2$ treatment. Also, a-PU was increased by several percentages (%) after the $O_2$ treatment.

FIG. 23 shows the measurement result obtained under the conditions that a CNT paste was formed, a green phosphor layer was disposed on an anode, $O_2$ treatment was performed at Va=3 kV and Ia=16 μA, a degree of vacuum in a chamber before injecting $O_2$ into the chamber was 8×10⁻⁵ torr, and a degree of vacuum of the chamber after injecting $O_2$ into the chamber was 8×10⁻⁴ torr. The triode type electron emission display device was driven at Va=1.5 kV and Ia=32 μA for 20 minutes for two times. Referring to FIG. 23, a-PU was 89.6% before the $O_2$ treatment and was 92% after the $O_2$ treatment. Here, p-PU was increased from 63.4% before the $O_2$ treatment to 73.5% after the $O_2$ treatment. Accordingly, pixel uniformity was improved due to the $O_2$ treatment.

Figure 24:
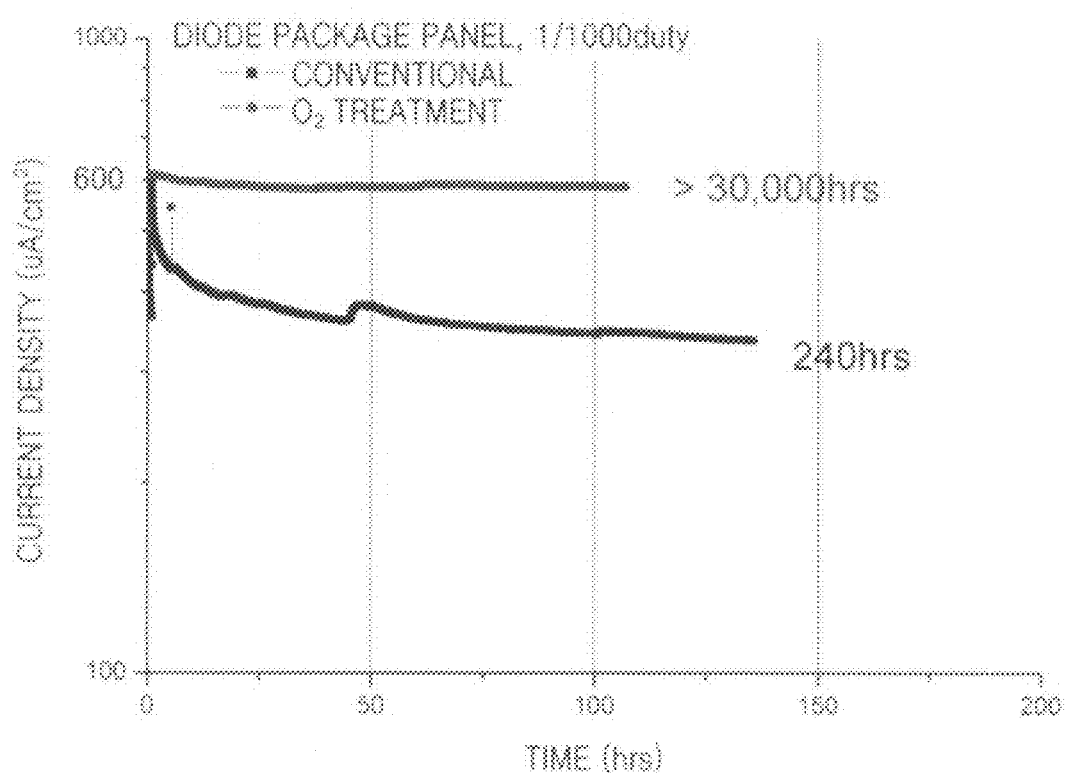
FIG. 24 is a graph illustrating current density versus time of a conventional diode package panel and a diode package panel employing an electron emission device manufactured by the manufacturing method of FIG. 2.

FIG. 24 is a graph illustrating current density versus time for a conventional diode package panel and a diode package panel employing an electron emission display device subjected to $O_2$ treatment according to the manufacturing method of FIG. 2 by comparing their two lifespan. Referring to FIG. 24, the half-value period of the diode package panel employing the electron emission display device subjected to the $O_2$ treatment was approximately 125 times higher than that of the conventional diode package panel.

In order to verify the effect of the method of manufacturing the electron emission device of FIG. 3, electrical aging, additional sintering in air conditions, and $O_2$ treatment, for improving the light emission uniformity and lifespan of an electron emission display device using CNT emitters were performed. The electrical aging improved the alignment and the uniformity in the shapes of the tips of the CNTs, and increased a-DU by several percentage points (%). When the electrical aging was performed together with the additional sintering in the air conditions, uniformity was further improved. Also, current half-value period was increased by about ten times according to the degree of the electrical aging. When electrons were emitted from the samples after injecting $O_2$ into the chamber, light emission uniformity was improved according to current and time. These improvements may be because loads were concentrated on the tips of the CNTs having relatively small diameters and/or great lengths and the tips of the CNTs were removed similarly in the electrical aging. Also, the sample subjected to the $O_2$ treatment reached a current stabilization section in a certain (or predetermined) time, and if the conditions were sufficient for the electrical aging, the sample reached the current stabilization section faster and lifespan of tens of thousands of hours were ensured.

References, which are incorporated herein by reference in their entirety, are provided below.

1. David S. Y. Hsu and Jonathan Shaw), "Integrally gated carbon nanotube–on=post field emitter arrays", Applied Physics Letters, vol 80, no. 1, 2002.
2. Jonathan Shaw, "Effects on surface oxides on field emission from silicon", J. Vac. Sci. Technol, B 18(4), 2000.
3. David S. Y. Hsu and Jonathan Shaw, "Regeneration of gated carbon nanotube field emission", J. Vac. Sci. Technol, B 23(2), 2005.
4. Wadhawan, R. E. Stallcup II, K. F. Stephens II, and J. M. Perez, "Effects of O2, Ar, and H2 gases on the field-emission properties of single-walled and multiwalled carbon nanotubes", Applied Physics Letters, vol. 79, no. 12, 2002.
5. X. H. Liang, S. Z. Deng, N. S. Xu, Jun Chen, N. Y. Huang, and J. C. She, "On achieving better uniform carbon nanotube field emission by electrical treatment and the underlying mechanism", Applied Physics Letters, vol. 88, 111501, 2006.

In view of the foregoing, an electron emission device including electron emission sources subjected to a post-process according to a method of manufacturing an electron emission device according to an embodiment of the present invention can improve uniformity between pixels, reduce hot spots, and remarkably increase lifespan.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A method of manufacturing an electron emission device, the method comprising:
    forming electron emission sources including a carbon-based material;
    emitting electrons from the electron emission sources in a chamber containing a reactive gas by applying a current to the electron emission sources at a current density ranging from 10 μA/cm² to 100 mA/cm²; and
    reacting the electron emission sources with the reactive gas in the chamber.

2. The method of claim 1, wherein the reactive gas comprises oxygen.

3. The method of claim 1, wherein the chamber containing the reactive gas has a vacuum degree ranging from $8\times10^{-6}$ to $8\times10^{-3}$ torr.

4. The method of claim 1, wherein the emitting of the electrons from the electron emission sources is performed for a period ranging from 10 minutes to 5 hours.

5. The method of claim 1, wherein the reactive gas comprises $CH_3$ or $H_2$.

6. An electron emission device comprising:
a plurality of gas reacted electron emission sources,
wherein each of the gas reacted electron emission sources comprises a carbon-based material, and
wherein the gas reacted electron emission sources are pre-processed electron emission sources reacted with a reactive gas while electrons are emitted from the pre-processed electron emission sources when a current is applied to the electron emission sources at a current density ranging from $10\ \mu A/cm^2$ to $100\ mA/cm^2$.

7. The electron emission device of claim 6, wherein the gas reacted electron emission sources are oxygen reacted electron emission sources.

8. The electron emission device of claim 6, wherein the gas reacted electron emission sources are vacuum chamber reacted electron emission sources reacted at a vacuum degree ranging from $8\times10^{-6}$ to $8\times10^{-3}$ torr.

9. The electron emission device of claim 6, wherein the gas reacted electron emission sources are electron emission sources reacted with the reactive gas for a period ranging from 10 minutes to 5 hours.

10. The electron emission device of claim 6, wherein the gas reacted electron emission sources are $CH_3$ or $H_2$ reacted electron emission sources.

11. The electron emission device of claim 6, wherein the carbon-based material comprises carbon nanotubes (CNTs).

12. A method of manufacturing an electron emission device, the method comprising:
forming electron emission sources including a carbon-based material;
electrically aging the electron emission sources;
sintering the electron emission sources in air;
emitting electrons from the electron emission sources in a chamber containing a reactive gas by applying a current to the electron emission sources at a current density ranging from $10\ \mu A/cm^2$ to $100\ mA/cm^2$; and
reacting the electron emission sources with the reactive gas.

13. The method of claim 12, wherein the reactive gas comprises oxygen.

14. The method of claim 12, wherein the chamber containing the reactive gas has a vacuum degree ranging from $8\times10^{-6}$ to $8\times10^{-3}$ torr.

15. The method of claim 12, wherein the emitting of the electrons from the electron emission sources comprises emitting the electrons from the electron emission sources for a period ranging from 10 minutes to 5 hours.

16. The method of claim 12, wherein the reactive gas comprises $CH_3$ or $H_2$.

17. The method of claim 12, wherein the carbon-based material comprises carbon nanotubes (CNTs).

* * * * *

UNITED STATES PATENT AND TRADEMARK OFFICE
CERTIFICATE OF CORRECTION

PATENT NO. : 7,798,882 B2  Page 1 of 1
APPLICATION NO. : 11/891264
DATED : September 21, 2010
INVENTOR(S) : Myung-Ick Hwang et al.

It is certified that error appears in the above-identified patent and that said Letters Patent is hereby corrected as shown below:

In the Drawings
FIG. 20, Sheet 12 of 15

Delete "BEFOR $O_2$ TREATMENT"
Insert -- BEFORE $O_2$ TREATMENT --

Signed and Sealed this
Twenty-seventh Day of December, 2011

David J. Kappos
*Director of the United States Patent and Trademark Office*